United States Patent [19]

Perkins

[11] 4,198,188
[45] Apr. 15, 1980

[54] LOAD ELEVATOR MECHANISM FOR UNSTABLE LOADS

[76] Inventor: William V. Perkins, 927 Crescent Dr., Monrovia, Calif. 91016

[21] Appl. No.: 785,647

[22] Filed: Apr. 7, 1977

[51] Int. Cl.² .............................................. B60P 1/44
[52] U.S. Cl. .................................... 414/545; 414/622
[58] Field of Search .................. 214/75 T, 75 R, 654, 214/75 G, 701 P, 730–731, 750; 187/1 R, 9 R; 414/540, 545, 622

[56] References Cited

U.S. PATENT DOCUMENTS

| | | | |
|---|---|---|---|
| 1,843,736 | 2/1932 | Remde | 214/654 |
| 2,405,054 | 7/1946 | Pringle | 214/75 T |
| 2,713,433 | 7/1955 | Gardner et al. | 214/654 |
| 3,567,054 | 3/1971 | Emke | 214/750 |

Primary Examiner—Albert J. Makay
Attorney, Agent, or Firm—Frederick E. Mueller

[57] ABSTRACT

A load platform is hingedly connected at its forward edge to the lower ends of a laterally spaced pair of vertically elongate runner assemblies that are vertically movably mounted on a supporting framework. Upper ends of the runner assemblies are fitted with pivotally mounted retainer brackets foldable between horizontally rearwardly extending load restraining position and vertically folded position. Selectively actuable means are provided for effecting pivotal movement of the load platform between horizontally rearwardly extending load bearing position and vertically extending folded position to concurrently effect folding and unfolding movement of the pair of bracket retainers by direct or indirect contact with the rear edge of the platform.

10 Claims, 8 Drawing Figures

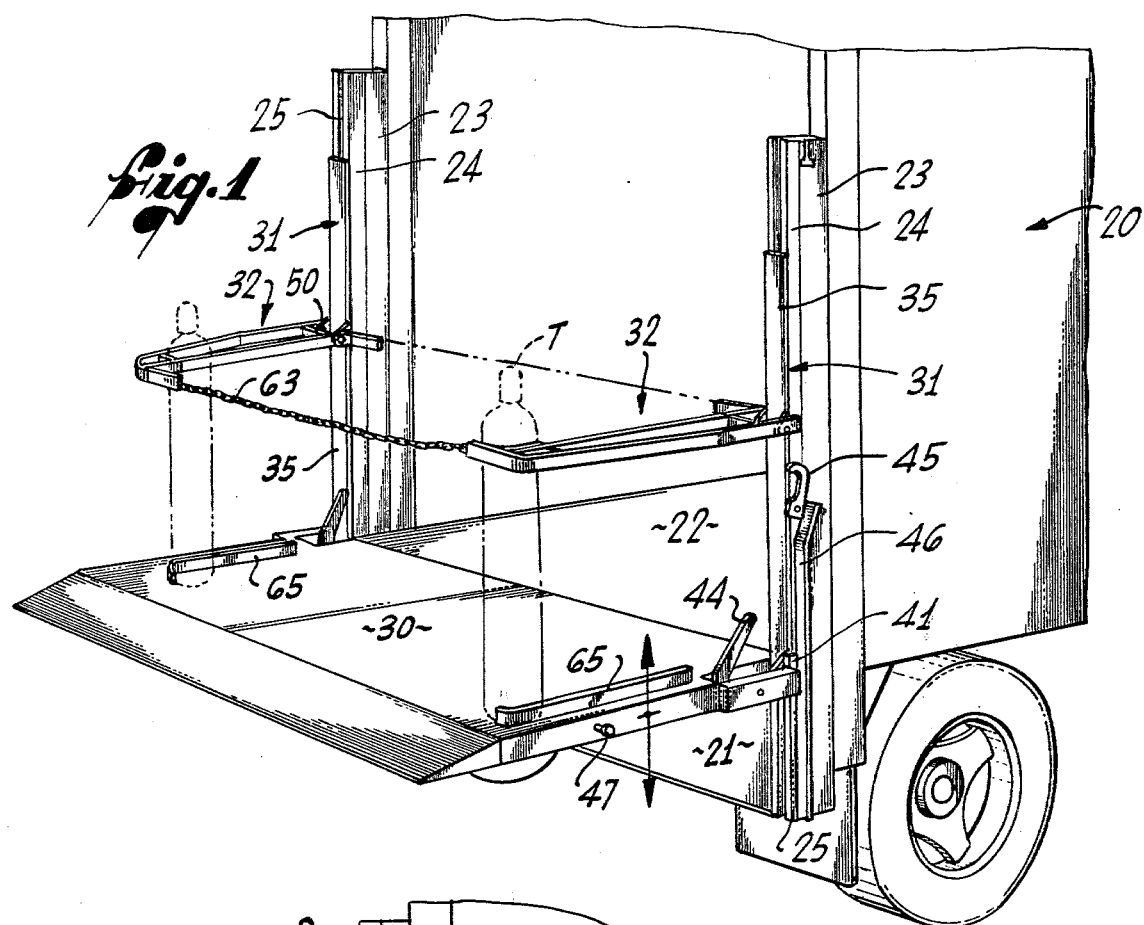
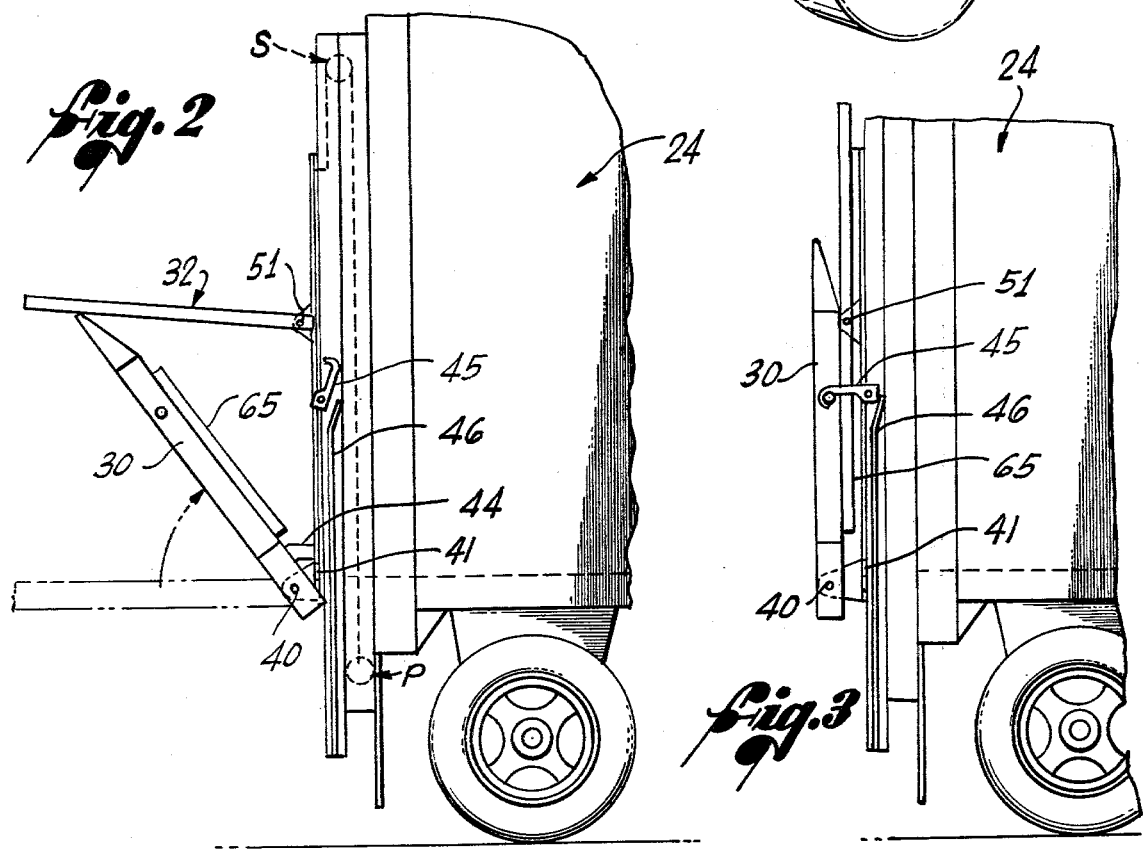

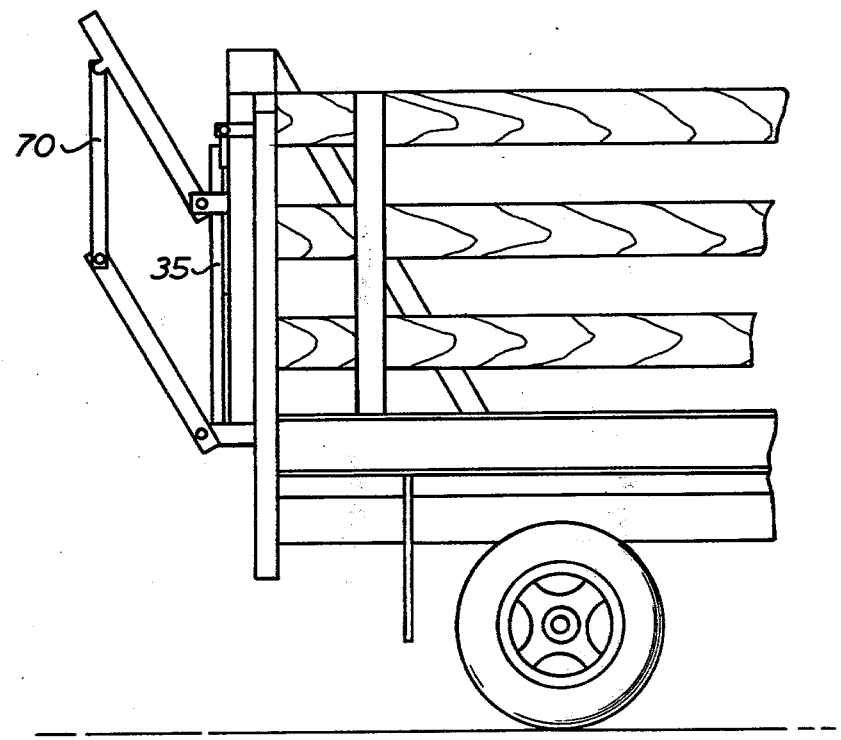

4,198,188

LOAD ELEVATOR MECHANISM FOR UNSTABLE LOADS

BACKGROUND OF THE INVENTION

This invention relates to load elevators of the foldable type, a common example of which is a truck tail gate lift, and more particularly to an improved load platform of this type incorporating means which can be unfolded, as a function of platform unfolding, for restraining relatively tall unstable loads on the platform against tipping.

In the use of load elevators it is sometimes necessary to raise and lower tall unstable loads, such as vertically elongate heavy cylinders of gas. In handling such loads, the lift operator commonly stands on the load platform with the tank or tanks to manually hold them vertically erect, which is a dangerous practice. Accordingly, attachments for load elevators have been devised taking the form of sections of rigid railing that can be detachably connected to the platform surface. However, as the railing mechanism is cumbersome to use, it is commonly not employed at all so that the operator continues the dangerous practice of riding the load elevator platform along with the unstable load. Accordingly, it is a major objective of this invention to provide an automatically foldable and unfoldable retainer bracket system for a foldable load elevator platform by means of which tall unstable loads, such as tanks, can be securely held in place during loading and unloading operations without the presence of an operator on the platform.

DESCRIPTION OF THE DRAWINGS

FIG. 1 is a perspective view of the load elevator of the present invention as incorporated in the tailgate lift for the rear end of a truck, illustrating the platform in horizontally extending load bearing position.

FIGS. 2 and 3 are schematic side elevational views illustrating different relative positions of components of the invention in their sequence of movement between folded and unfolded configurations.

FIG. 8 is a schematic side elevational view illustrating an alternative embodiment of the invention.

DESCRIPTION OF THE PREFERRED EMBODIMENT

Figure 4:
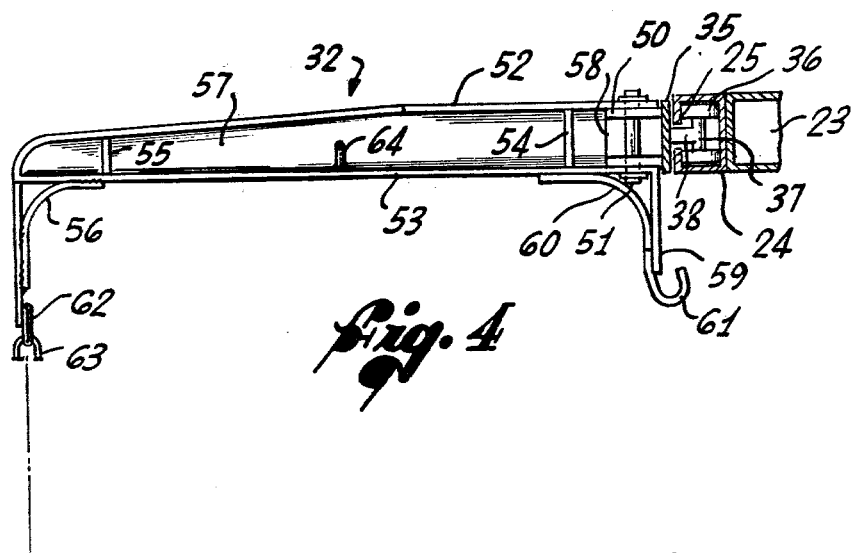
FIG. 4 is a top plan view of one of the retainer brackets of the load elevator and of its connection to a runner assembly on the supporting framework.
Figure 5:
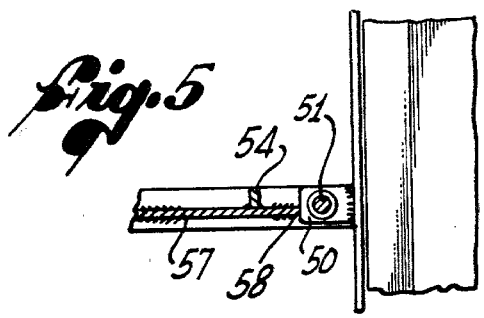
FIG. 5 is a partial side elevational view, partly in section, of the retainer bracket/framework connection of FIG. 4.

Referring to FIG. 1, the invention is illustrated as embodied in a lift gate affixed to the rear end of a freight truck 20. The supporting framework for the load elevator includes a box-like cross frame 21 having its upper face flush with the floor 22 of the van body. At the opposite ends of the cross frame 21 are a pair vertically extending frame members 23 which may comprise box beam members secured to or defining the tail gate opening of the van body. Rigidly secured to the rear face of lift frame members 23 are elongate vertically extending lift guide channels 24, which may be of essentially C-shaped cross-sectional configuration as shown in FIG. 4. The rear face of each guide member has a rearwardly opening full length vertically extending slot 25. It will be noted that the lower ends of the pair of hollow guide members 24 terminate in a common horizontal plane spaced vertically downwardly beneath the horizontal plane of the floor 22 of the van body.

The load elevator includes a ramp edged load platform 30 and a pair of runner assemblies 31 that are vertically movable in the pair of guide channels 24. The forward edge of the platform is hingedly connected to the lower ends of the runner assemblies 31 and a pair of retainer brackets 32 are pivotally connected to upper ends of the pair of runner assemblies. The parts are so related and proportioned that angular movement of the platform, in turn, effects folding or unfolding of the retainer bracket. Preferably, the means for folding and unfolding of the platform constitutes a selectively actuable means for translating vertical movement of the platform into pivotal movement of the platform.

More specifically, each of the runner assemblies 31 includes a vertically elongate bar 35 mounted on the slotted rear face of the corresponding one of the guide members 24. Within the guide member the bar 35 carries a longitudinally spaced apart series of pairs of wheels 36 for vertically rolling engagement with the inner surface of the corresponding guide member. By way of example, and as is shown in FIG. 4, each pair of wheels may be mounted on a common axle means 37 that in turn is carried on an inner end of a stud 38 or the like which projects through the channel slot 25 and is secured, as by welding, to the forward face of the runner bar 35.

While not illustrated in detail, it will be understood that the pair of runner assemblies 31 are connected to a common source of power to effect raising and lowering of the pair of runner assemblies in unison. Such means shown schematically in dotted outline in FIG. 2 could take the form of a pulley and cable system S with a power source P housed in the transverse box frame 21 and having cables reeved through the pair of frame members 23 and hollow guide members 24, with a pair of cable ends secured to upper ends of the pair of runner assemblies 31. This, and a variety of other platform power mechanisms, are well known in the art.

Figure 6:
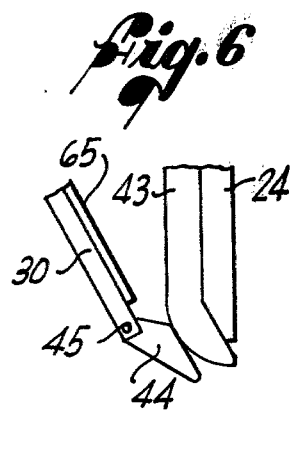
FIGS. 6 and 7 are schematic partial side elevational views of cam components of the load elevator in different relative positions in their sequence of movement between the folded and unfolded conditions of the platform.
Figure 7:
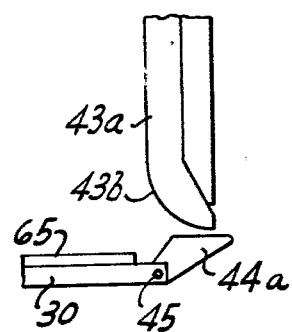

At their lower ends, the pair of runner assemblies 31 carry horizontal hinge means 40 interconnected to the forward edge of the platform 30 to support the platform for movement between a rearwardly horizontally entended and a vertically load-bearing position and vertically extending folded position. As one exemplary means of holding the platform 30 in the load bearing position, each of the runner bars 35 may be fitted along one edge with a stop member 41, as is best seen in FIG. 1. Turning of the platform between vertical and horizontal positions may be accomplished by a cam means, responsive to vertical movement of the pair of runner assemblies 31, of the type shown in my U.S. Pat. No. 4,007,844. For present purposes, suffice it to say that at least one of the guide members 24 is provided with a fixed cam member 43 mounted in vertical alignment with a cam follower element 44 carried at the forward edge of the platform 30. As is shown in FIGS. 6 and 7, the cam follower 44 is pivotally mounted on a shaft 45 and is normally biased to the protruding position illustrated in FIG. 1. The cam 43 has a vertically extending straight edge 43a merging into lowermost curved cam section 43b, the cam follower having a straight edge 44a that is slidable over the surfaces of the cam.

Assuming the platform to be in the vertical folded position of FIG. 3, upon movement downwardly of the platform assembly and, therefore, of the cam follower 44, the latter comes into sliding engagement with the curved section 43b of the cam to gradually unfold the platform 30 in a positively restrained manner until the platform attains the horizontal load bearing position. Subsequently, upon further lowering of the runner assemblies 31 the cam follower is free to be biased to the protruding position illustrated in FIG. 1, in which the cam followers are out of interfering alignment with their corresponding cams. As shown in my aforesaid patent, in order to fold the platform, means are provided for holding the cam follower in the positions of FIG. 6 and 7 in interfering and operative alignment with the cams 43.

The load elevator may also be provided with a latch mechanism to maintain the platform securely locked in the tailgate position. This latch may take the form also disclosed in detail in my aforementioned patent, comprising a manually operable hook 45 carried by one of the runner assemblies 31 and a cooperating hook locking bar 46 on the corresponding guide channel 24. A lock pin 47 is mounted on one edge of the platform 30 for selective engagement and disengagement by the hook 45.

Each of the runner bars 35 adjacent its upper end is fitted with a rearwardly projecting pair of ears 50 to support a hinge pin 51 on which the corresponding retainer bracket assembly 32 is mounted. Each of the retainer assemblies includes an outer arm 52 and an inner arm 53 rigidly interconnected by a spaced pair of gussetts 54 and 55. The outer arm 52 is generally J-shaped in plan configuration, as shown in FIG. 4, so that its terminal rear end portion projects inwardly relative to the load bearing platform 30. An arcuate retainer strap 56 is affixed, as by welding, in the outermost corner defined by the pair of arms. A reinforcing plate 57 is fitted between the inner and outer arms 53, 52 having a rear edge 58 projecting forwardly of the forward gussett 54 and thus defining an abutment or stop for engagement with rear edges of the ears 50 to maintain the retainer bracket 32 in the horizontal position.

At its inner end, each retainer bracket 32 has an inwardly projecting strap 59 welded to the inner arm 53 defining a corner in which another arcuate retainer strap 60 is affixed, as by welding. The bar 59 also has a rope hook 61 welded thereto while, at the outer end of the retainer assembly, the inwardly projecting portion of the outer arm 52 has a hook 62 welded thereto to which one end of a length of chain 63 is connected. A hook eye 64 may also be provided midway between the gussetts 54 and 55 on the outer face of the inner arm 53. Along opposite side edges of the platform 30, on the load bearing surface, a pair of toe bars 65 of elongate J-shaped configuration are secured, as by welding, with the curved portions thereof projecting inwardly. As is shown in FIG. 1, each of the toe bars 65 is vertically in substantially congruent alignment with an inner arm 53 of the corresponding retainer bracket 32.

As is best seen in FIG. 2, the parts of the load elevator mechanism are so proportioned and arranged that when the platform 30 is undergoing rotation under the influence of the cam means shown in FIGS. 6 and 7, the arc of movement of the outer rear edge of the platform intercepts the normal horizontal plane of the retainer bracket assemblies 32. States otherwise, the front to rear length of the platform 30 exceeds the vertical spacing between the pivot axes 40 and 51 of the platform 30 and retainer brackets 32 respectively. Preferably, the length of the platform 30, rearwardly from its pivot axis 40, is such that the load bearing surface of the folded platform extends upwardly beyond the retainer bracket pivot axis 51, as shown in FIG. 3, so that when the platform 30 is in the fully vertically erect position the retainer brackets 32 are folded flat against their corresponding runner bars 35. It will be appreciated that the retainer bracket assemblies 32 are gravitationally biased against the outer or rear free edge of the platform 30 so that at all times in their arcuate range of movement between horizontal and vertical positions their angular positions are a function of the corresponding pivotal rotation of the load platform 30.

As will now be apparent, and referring particularly to FIG. 1, when the load elevator mechanism is in the unfolded condition and tall unstable loads, such as the vertically elongated slender exemplary tanks T, shown in phantom outline, are placed on the platform 30, they are securely held against dangerous tipping. At both sides of the platform the tank or tanks may be stacked with the foot thereof against the toe plate 65 and the upper end against one of the retainer brackets 32. The corresponding chain 63 for each retainer bracket may be utilized to lash the tanks at their upper ends, the end of the chain being fastenable to the rope hook 61 at the inner end, the intermediate eye 64, or extended between the free ends of both retainer brackets 32 depending upon the lateral magnitude of the load.

While a preferred embodiment of the invention has been described, it will be apparent to those skilled in the art that it may be practiced in other forms without departing from its spirit and scope. For example, as shown in FIG. 8 in lieu of direct contact between the outer end of the platform and the rear ends of the retainer brackets, a parallelogram linkage may be used, as by adding a vertical link 70, substantially parallel to runner bar 35, extending between the platform edge and the corresponding retainer bracket.

I claim:

1. A foldable load elevator comprising:
    a supporting framework;
    a vertically elongate rigid member mounted on said framework for vertical movement;
    a platform having means on a forward edge for pivotally connecting said platform to the lower end of said member for movement of said platform between a horizontally rearwardly extending load bearing position and an upwardly vertically extending folded position;
    a gravitationally biased retainer bracket pivotally connected to the upper end of said member movable between a horizontally rearwardly extending position and an upwardly vertically extending folded position; and
    means for automatically folding and unfolding said retainer bracket concurrently with and as a function of folding and unfolding pivotal movement of said platform.

2. A load elevator as in claim 1 in which said means comprises a vertical spacing between the pivotal axes of said platform and of said retainer bracket that is less than a front to rear dimension of said platform.

3. A load elevator as in claim 1 having power means for effecting pivotal movement of said platform.

4. A load elevator as in claim 1 having platform folding and unfolding means intermediate said platform and framework to translate vertical movement of said member into folding or unfolding movement of said platform.

5. A load elevator as in claim 4 in which said last mentioned means comprises cam means.

6. A foldable load elevator comprising:
a support framework having a laterally spaced apart pair of vertically extending guide channels;
a pair of vertically elongate runner assemblies mounted on said guide channels for vertical movement in unison;
a platform having a forward edge horizontally pivotally connected to lower ends of said runner assemblies;
a pair of gravitationally biased retainer brackets pivotally connected to the upper ends of said runner assemblies, each of said retainer brackets being movable between a horizontally rearwardly extending position and an upwardly vertically extending folded position;
means for automatically folding and unfolding said pair of retainer brackets as a function of folding and unfolding pivotal movement of said platform; and means intermediate said platform and said framework to translate vertical movement of said pair of runner assemblies into folding or unfolding movement of said platform.

7. A load elevator as in claim 6 in which said means to translate movement of said runner assemblies into pivotal movement of said platform comprises cam means.

8. A load elevator as in claim 6 in which said means for folding and unfolding said pair of retainer brackets concurrently with folding and unfolding pivotal movement of said platform comprises a vertical spacing between the pivotal axes of said platform and of said retainer brackets that is less than a front to rear dimension of said platform.

9. A load elevator as in claim 6 in which said platform along the opposite sides thereof is provided with generally J-shaped toe plates secured thereto and having rear terminal end portions projecting laterally inwardly of said platform and in which each of said retainer brackets has shape characteristics adapted for substantially congruent superposition relative to said toe plates.

10. A load elevator as in claim 6 in which at least one of said retainer brackets carries a flexible element for securing a load relative to said retainer bracket.

* * * * *